United States Patent
Seino

(10) Patent No.: US 6,974,499 B1
(45) Date of Patent: Dec. 13, 2005

(54) SOIL IMPROVING AGENT INCLUDING SOIL HARDENING AGENT AND GROUND IMPROVING AGENT, SOIL IMPROVING METHOD INCLUDING SOIL HARDENING METHOD AND GROUND IMPROVING METHOD, AND IMPROVED GROUND

(75) Inventor: Akihiro Seino, Tokyo (JP)

(73) Assignee: Oosaki Corporation, Tokyo (JP)

( * ) Notice: Subject to any disclaimer, the term of this patent is extended or adjusted under 35 U.S.C. 154(b) by 0 days.

(21) Appl. No.: 10/220,101

(22) PCT Filed: Aug. 31, 2000

(86) PCT No.: PCT/JP00/05936

§ 371 (c)(1),
(2), (4) Date: Apr. 7, 2003

(87) PCT Pub. No.: WO01/68788

PCT Pub. Date: Sep. 20, 2001

(30) Foreign Application Priority Data

Mar. 15, 2000 (JP) .............................. 2000-072945

(51) Int. Cl.⁷ ............................................ C04B 12/00
(52) U.S. Cl. ................... 106/217.7; 106/900
(58) Field of Search ....................... 106/217.9, 287.24, 106/900, 217.7

(56) References Cited

U.S. PATENT DOCUMENTS

| 4,955,399 A | * | 9/1990 | Potter et al. ................. 131/359 |
| 5,125,950 A | | 6/1992 | Bertram |
| 5,612,320 A | * | 3/1997 | Wurtman et al. ............. 514/54 |
| 5,709,813 A | * | 1/1998 | Janke et al. .................. 252/70 |
| 2005/0112239 A1 | * | 5/2005 | Rudin et al. .................. 426/52 |

FOREIGN PATENT DOCUMENTS

| WO | WO 99/58623 | 11/1999 |
| WO | WO99/58623 | 11/1999 |

OTHER PUBLICATIONS

Derwent XP 002152577(Eng.Abst.JP19850267096-Nov. 29, 1985).
Derwent XP 00215257(EngAbst.JP19820193414 Nov. 5, 1982.
Database WPI, XP00212576, JP 59 084972A (May 1984).
Database WPI, XP002152577, JP 62 128993A (Jun. 1987).

* cited by examiner

Primary Examiner—David Brunsman
(74) Attorney, Agent, or Firm—Hedman & Costigan, P.C.

(57) ABSTRACT

A soil improving agent comprising malic acid and/or grape sugar is mixed with soil to enable the ground after consolidation to have good water permeability and strength.

3 Claims, No Drawings

SOIL IMPROVING AGENT INCLUDING SOIL HARDENING AGENT AND GROUND IMPROVING AGENT, SOIL IMPROVING METHOD INCLUDING SOIL HARDENING METHOD AND GROUND IMPROVING METHOD, AND IMPROVED GROUND

This application is a 371 filing of PCT/JP00/05936, filed 31 Aug. 2000.

BACKGROUND OF THE INVENTION

1. Field of the Invention

The present invention relates to soil improvement technology used in various applications such as road construction, land development and the reinforcement of embankment slopes, and in particular relates to a soil improving agent including a soil hardening agent and a ground improving agent, a soil improving method including a soil hardening method and a ground improving method, and an improved ground which makes it possible to solve the problems associated with secondary damage such as soil contamination and groundwater contamination due to various earthworks, and which makes it possible to harden the surface of easily scattered soil in order to prevent wind damage.

2. Description of the Prior Art

In the prior art, because soil strength is increased by means of an aggressive improvement method using soil improvement materials such as cement-type hardening agents which include heavy metals, large quantities of lime and large quantities of normal cement, this creates problems including secondary damage such as soil contamination and groundwater contamination.

Namely, the use of such prior art soil improving materials has the following disadvantages:

1. When a cement-type hardening agent which includes heavy metals is used, the soil becomes contaminated by the heavy metals. Further, these heavy metals can also contaminate the groundwater.

2. When large quantities of lime and normal cement are used, operations can be hazardous due to the large quantity of heat generated. Further, after hardening has taken place, an unstable structure is created due the occurrence of cracks and the like. Moreover, because a complete mixing of cement and the like is difficult to achieve, the resulting structure lacks uniformity. Furthermore, in the case where lime and ordinary cement are used, the soil itself is killed, and after hardening of the cement and the like, the water permeability deteriorates and a weak stratum is created in the boundary where such soil improvement materials are used. Consequently, these prior art soil improving materials are considered to be inadequate.

3. When lime and ordinary cement are used, these materials require the mixing of large amounts of powdered materials, and this creates dust problems.

4. When lime and ordinary cement are used, because no improvement of the organic soil characteristics are achieved for the soil particles themselves, there is a rough improvement in density, but because there are few gaps between the soil particles, the improved ground has poor water permeability, and as a result, the soil structure lacks uniform strength.

SUMMARY OF THE INVENTION

In view of the problems of the prior art described above, it is an object of the present invention to provide an improved soil, a soil improving agent including a soil hardening agent and a ground improving agent, and a soil improving method including a soil hardening method and a ground improving method, and an improved ground which makes it possible to solve the problems of soil contamination and groundwater contamination, which makes it possible for hardened ground to have good water permeability, and which makes it possible to harden the ground while keeping the soil alive in a natural state in order to increase the strength of the soil and prevent wind damage.

In order to achieve the object stated above, malic acid and/or grape sugar are used as the main components of the soil hardening agent and the ground improving agent which comprise the soil improving agent of the present invention. The amount of these components of the soil improving agent are changed in accordance with the acidity, alkalinity, metal content and inorganic matter content of the soil. Preferably, such components of the soil improving agent are in the form of a liquid or powder. Further, the soil improving agent may include an assisting agent such as sodium chloride or sodium hydrogencarbonate.

In one embodiment of the soil improving method which includes a soil hardening method and a ground improving method according to the present invention, soil is mixed with a soil improving agent comprising malic acid and/or grape sugar, and then after mixing, a pressure hardening is carried out.

In another embodiment of the soil improving method which includes a soil hardening method and a ground improving method according to the present invention, a soil improving agent comprising malic acid and/or grape sugar is spread uniformly over the surface of the soil, and then only the surface of the soil is subjected to hardening.

The improved ground according to the present invention comprises a consolidation hardened mixture of soil and a soil improving agent having malic acid and/or grape sugar as a major component to provide good water permeability and strength.

PRINCIPLE AND OPERATION

When the soil improving agent of the present invention is used to improve a soil, the malic acid and/or grape sugar molecules migrate toward each of the organic soil particles and form a covering on the surfaces thereof, whereby the soil particles form separate inorganic particles having a well-ordered arrangement. Then, after pressure is applied to carry out consolidation, the ground obtained thereby has good water permeability and strength.

In this regard, depending on the properties of the soil, there are cases where it is possible to use only malic acid or only grape sugar as the main component of the soil improving agent, but the use of both malic acid and grape sugar is preferred because such combination makes it possible to carry out a smooth hardening of the soil. Namely, malic acid or grape sugar has an affinity to the organic portions, and malic acid or grape sugar covers the surroundings thereof.

Further, the soil improving agent may be used in liquid or powdered form depending on the specific requirements of the soil, and as described above, the soil improving agent of the present invention is used as a soil hardness improving material.

For example, in the case where the obstructing component of the soil is soft organic matter, because the malic acid covers the organic soil particles to form inorganic particles which are held together by the grape sugar, the soil is not destroyed during pressure consolidation. Further, the use of malic acid and/or grape sugar makes it possible to prevent damage due to cracking and the like, and makes it possible to easily improve the soil while preserving the natural state thereof.

Furthermore, by spreading the soil improving agent of the present invention over the surface of a soil and then compacting only the surface of such soil, it is possible to easily cure the soil to prevent the soil matter from being scattered.

DETAILED DESCRIPTION OF THE PREFERRED EMBODIMENTS

Embodiment 1

Thirty two liters of a 2% soil improving agent solution comprising 15 g of malic acid and 10 g of grape sugar per liter of water was added to and mixed with a soil containing organic matter and having a density of 1.6 ton/m$^3$, and then rollers were used to compact the mixture to obtain an improved ground having a consolidated structure. The obtained improved ground was determined to have good water permeability and strength.

Embodiment 2

Sodium hydrogencarbonate was added to a weak ground having a high water content soil comprised of sludge and the like to remove the water between the soil particles and thereby lower the water content. Next, a soil improving agent comprised of a mixture of malic acid and grape sugar in the form of a granulated powder was added to and mixed with the soil, and then rollers were used to compact the mixture to obtain an improved ground having a consolidated structure. The obtained improved ground was determined to have good water permeability and strength.

Embodiment 3

In the case where the slope of an embankment is to be reinforced, a soil improving agent solution comprised of 30 g of malic acid and 50 g of grape sugar per liter of water is spread uniformly over the surface of an easily scattered soil (e.g., the top soil in road construction, land development, etc.), and then by hardening only the surface of the soil, it is possible to easily cure the soil and prevent the soil particles from being scattered by wind and the like.

The soil improving agent of the present invention is harmless to people and animals, and as described above, when the soil improving agent is mixed with the soil or distributed on the surface of the soil, the organic soil particles become covered and separated from each other. Then, when these separated soil particles are consolidated, the grape sugar and/or malic acid binds the soil particles together, and the soil is kept alive in a natural state. Further, because water permeability can be maintained while hardening the soil, and because the strength of the soil is increased, the soil improvement achieved by the present invention is extremely reliable.

Namely, the soil improving agent including a soil hardening agent and a ground improving agent, the soil improving method including a soil hardening method and a ground improving method, and the improved ground according to the present invention eliminates the problem of soil contamination, maintains good water permeability for consolidated ground, and increases the strength of the soil while keeping the soil alive in a natural state.

Furthermore, by uniformly spreading the soil improving agent of the present invention over the surface of a soil and then hardening only such soil surface, it becomes possible to easily cure the soil and prevent the soil particles from being scattered by wind and the like.

What is claimed is:

1. A soil hardening agent, comprising:
malic acid and grape sugar as main constituents in the ratio of 60–37.5% of malic acid; 40–62.5% of grape sugar which improves the permeability of the ground to water, is harmless to people and animals, and increases the strength of the soil.

2. A soil hardening method, comprising the steps of:
mixing a soil and a soil improving agent including as the main constitutents 60–37.5% malic acid and 40–62.5% grape sugar; and
pressure hardening the mixture of soil and soil improving agent after the mixing step.

3. An improved hardened ground, comprising:
soil; and
a soil hardening agent including malic acid and grape sugar in the ratio of 60–37.5% of malic acid and 40–62.5% grape sugar;
wherein the soil and the soil improving agent are mixed and hardened by consolidation.

* * * * *